United States Patent [19]

Scott

[11] Patent Number: 5,693,114

[45] Date of Patent: *Dec. 2, 1997

[54] MULTIPLE ORIFICE GLASS FEED UTILIZING PLUNGERS

[75] Inventor: Garrett L. Scott, Toledo, Ohio

[73] Assignee: Owens-Brockway Glass Container Inc., Toledo, Ohio

[*] Notice: The term of this patent shall not extend beyond the expiration date of Pat. No. 5,540,747.

[21] Appl. No.: 686,640

[22] Filed: Jul. 24, 1996

Related U.S. Application Data

[63] Continuation of Ser. No. 307,542, Sep. 16, 1994, Pat. No. 5,540,747, which is a continuation of Ser. No. 48,636, Apr. 19, 1993, abandoned.

[51] Int. Cl.⁶ .................................................. C03B 7/086
[52] U.S. Cl. ........................... 65/328; 65/330; 65/362
[58] Field of Search ................................ 65/221, 324, 325, 65/328, 330, 331, 362, 126, 129; 24/135 A, 135 R, 136 B

[56] References Cited

U.S. PATENT DOCUMENTS

| | | | |
|---|---|---|---|
| 1,529,948 | 3/1925 | Freese . | |
| 1,631,061 | 5/1927 | Rankin | 65/331 |
| 1,675,819 | 7/1928 | Peiler | 65/330 |
| 1,792,932 | 2/1931 | Rule . | |
| 1,798,217 | 3/1931 | Noble | 65/221 |
| 1,926,764 | 9/1933 | Dorman . | |
| 2,003,058 | 5/1935 | Stenhouse . | |
| 3,248,204 | 4/1966 | Tyner | 65/362 |
| 3,582,309 | 6/1971 | Brucken | 65/328 |
| 3,711,266 | 1/1973 | Daly . | |
| 4,478,631 | 10/1984 | Mumford . | |
| 4,551,163 | 11/1985 | Duga et al. | 65/129 |
| 4,554,000 | 11/1985 | Suomala . | |
| 4,581,054 | 4/1986 | Mumford . | |
| 4,793,849 | 12/1988 | Bratton . | |
| 5,540,747 | 7/1996 | Scott | 65/328 |

*Primary Examiner*—Steven P. Griffin

[57] ABSTRACT

A multiple glass feed system for use with a glass forehearth including a plurality of closely spaced plungers, each of which is individually adjusted independently of the other. The upper end of each plunger is oval in cross section and the lower end is round. The oval portions of the plungers are each supported in an individual clamping mechanism having a chuck housing, a curved liner plate within the housing, and a cap screw which extends between the housing and liner plate to engage the upper end of the plunges and clamp the plunger in the housing to arrange the plungers in side by side relation to each other with the long axis of each oval portion parallel to the long axis of the adjacent plungers.

2 Claims, 4 Drawing Sheets

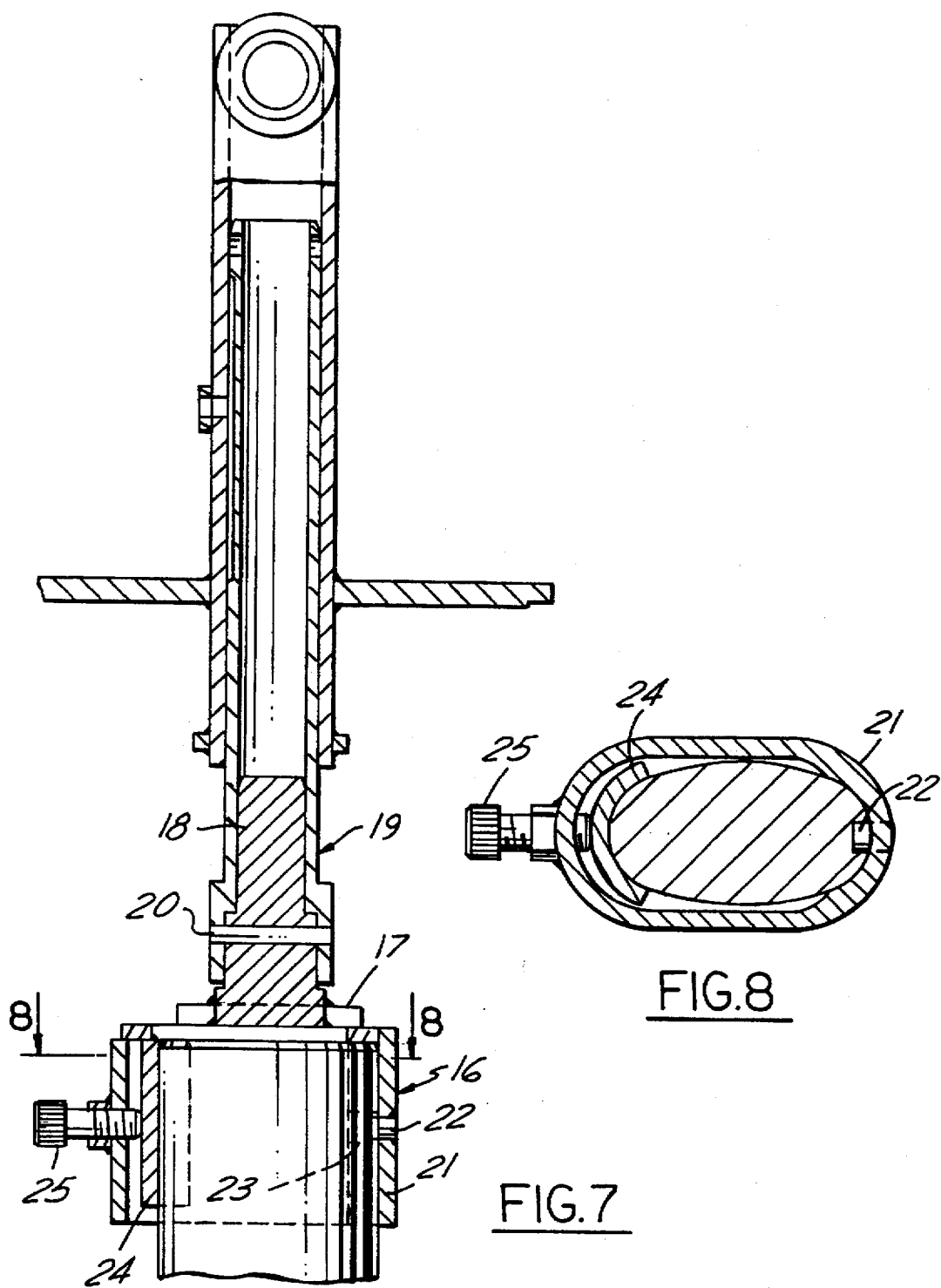

MULTIPLE ORIFICE GLASS FEED UTILIZING PLUNGERS

This application is a continuation of application Ser. No. 08/307,542 filed Sep. 16, 1994, now U.S. Pat. No. 5,540,747, which was, in turn, a continuation of application Ser. No. 08/048,636 filed Apr. 19, 1993, now abandoned.

This invention relates to multiple orifice feed systems for producing glass gobs.

BACKGROUND AND SUMMARY OF THE INVENTION

In the manufacture of glass articles, it is common to provide a glass forehearth and multiple orifices which are controlled by reciprocable needles or plungers in order to provide the necessary uniform weight of gobs. Plural needles and orifices are utilized in order to maximize glass production.

Typical systems are shown in U.S. Pat. Nos. 1,529,948, 1,792,932, 1,926,764, 3,711,266, 4,478,631, 4,554,000, 4,581,054 and 4,793,849.

In such systems, the plungers are conventionally round in cross section. When the plungers are long, on the order of 30" to 48" long, with diameters about 2 to 2½" the strength of the plungers may not be adequate.

Among the objectives of the present invention are to provide a multiple orifice feed system wherein the plungers are configured such that they have greater strength and durability; wherein the increased strength is achieved without affecting the placement of the plungers; and wherein the plungers can be positioned in closely spaced relationship as desired.

In accordance with the invention, a multiple glass feed system is provided for use with a glass forehearth including a plurality of closely spaced plungers, each of which is individually adjustable relative to the other. The upper end of each plunger is oval in cross section and the lower end is round. The oval portions of the plungers are provided in side by side relation with the long axis of each oval portion being parallel to the long axis of the adjacent plungers.

DESCRIPTION OF THE DRAWINGS

FIG. 7 is a fragmentary sectional view of a plunger taken along the vertical line 7—7 in FIG. 6.

FIG. 8 is a sectional view taken along the line 8—8 in FIG. 7.

DESCRIPTION

Figure 1:
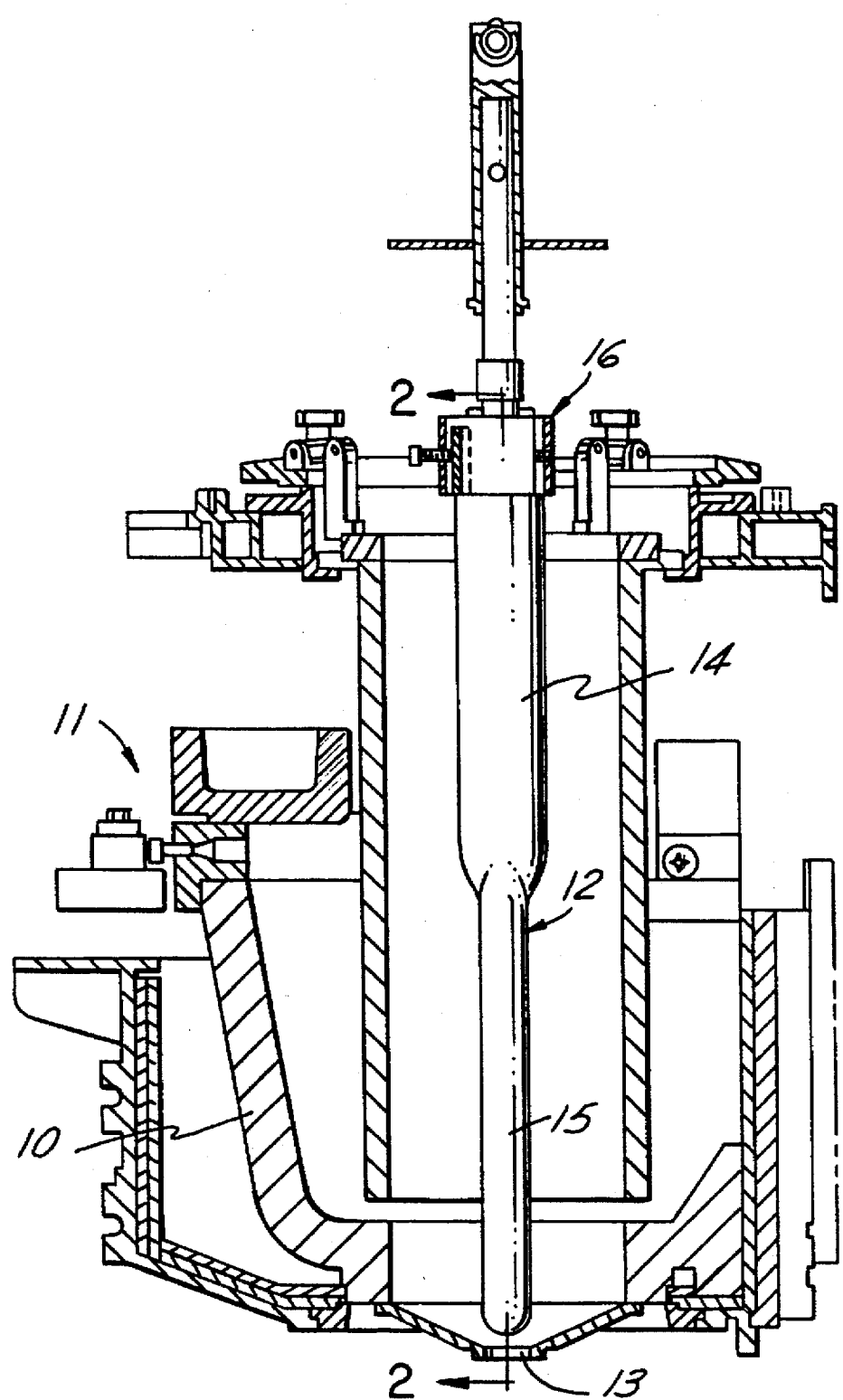
FIG. 1 is a part sectional elevational view of a multiple orifice feed system for producing glass gobs embodying the invention.
Figure 2:
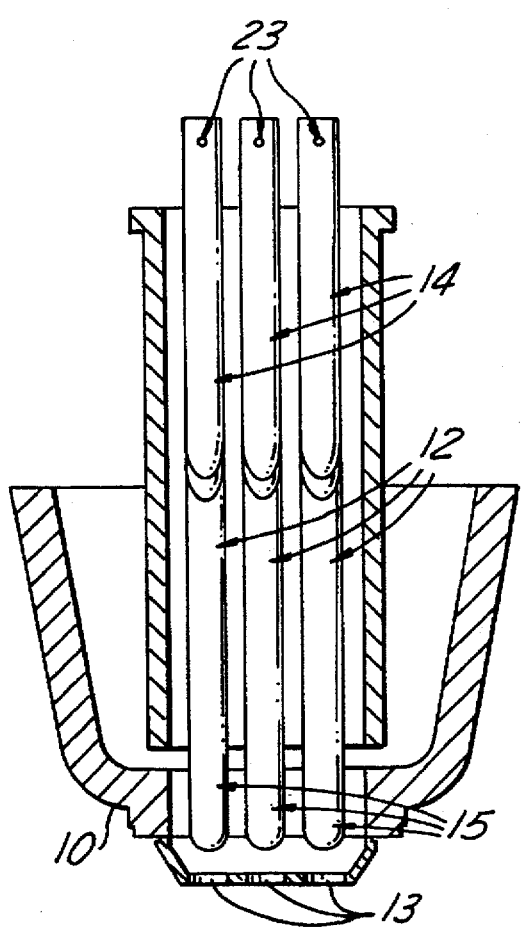
FIG. 2 is a vertical view taken along the line 2—2 in FIG. 1

Referring to FIG. 1, the multiple orifice glass feed system embodying the invention comprises a bowl 10 of a forehearth 11 and a plurality of vertical plungers 12 that function in connection with orifices 13. The plungers 12 are reciprocable to control the flow of glass out of the orifices 13 so that when associated shears, not shown, are used the size and weight of the gobs is consistent.

Figure 3:
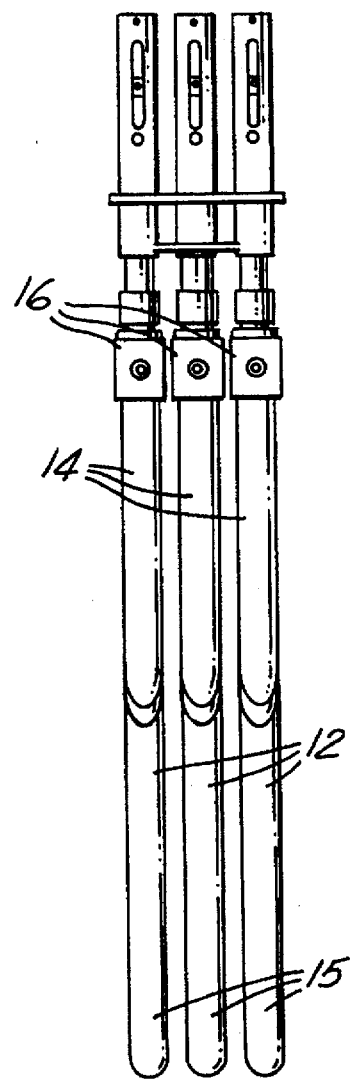
FIG. 3 is a side elevational view of the plungers, parts being broken away.
Figure 4:
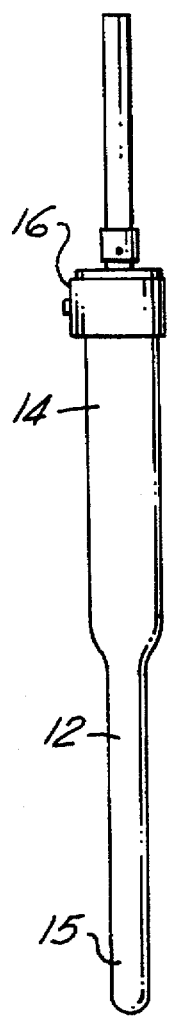
FIG. 4 is a front elevational view of a plunger shown in FIG. 1.
Figure 6:
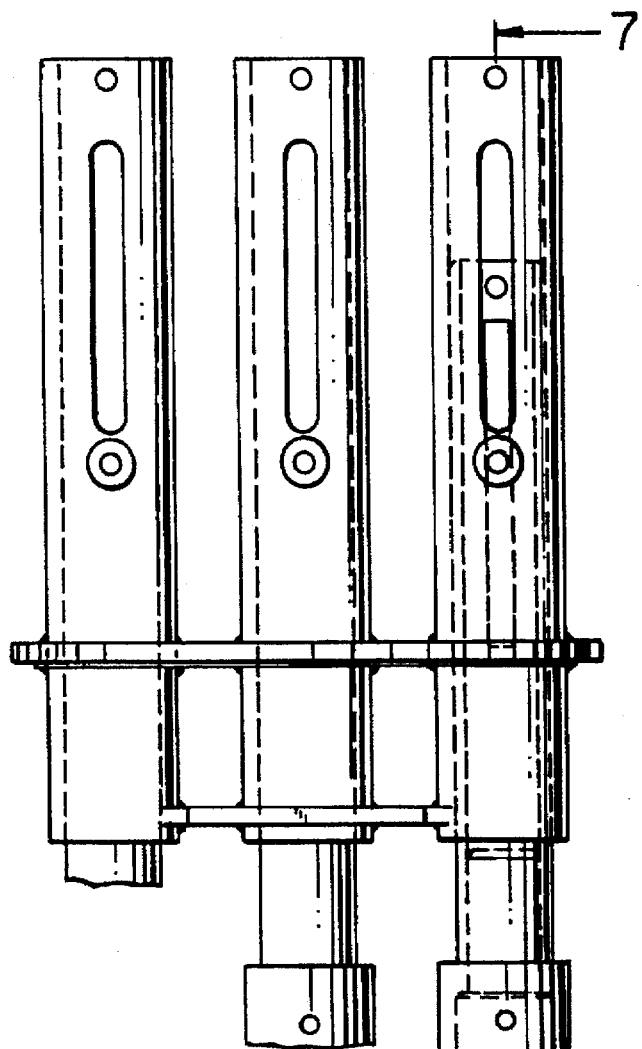
FIG. 6 is a fragmentary side view on an enlarged scale of a portion of the support mechanism for the plungers shown in FIG. 3.
Figure 5:
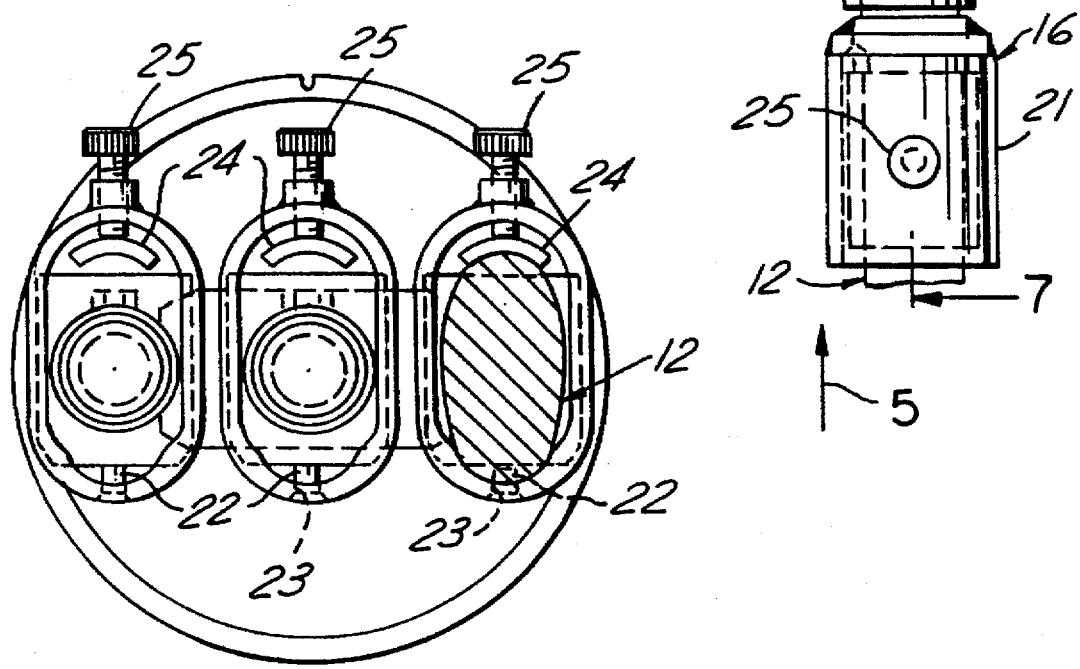
FIG. 5 is a fragmentary bottom view taken in the direction of the arrow 5 in FIG. 6, parts being broken away.

In accordance with the invention, each plunger 12 has an upper portion that is oval in horizontal cross section and a lower portion 15 that is cylindrical in horizontal cross section. Each upper oval portion has a long axis and a short axis. The plungers are supported by clamping mechanisms 16 in side by side relation with the long axis of the oval portion 14 lying in a plane with the planes of adjacent plungers 12 being parallel so that the plungers are in closely spaced relation (FIG. 3). The upper oval portion of each plunger has the same oval cross section. The cylindrical portions of each plunger have the same diameter. As a result, the strength and durability of the plungers is substantially increased. The lower ends of the lower portions 15 project into the forehearth 11 adjacent the orifices 13.

Referring to FIGS. 5–8, each clamping mechanism 16 comprises an upper plate 17 which has a connecting pin 18 fixed thereon and telescopically received in an actuator tube 19 and held therein by a pin 20. Each clamping mechanism 16 further comprises an oval chuck housing 21 which has a greater oval cross section than the oval upper portion 14 of the respective plunger 12. Chuck housing 21 includes a locating pin 22 in one end of the housing 21 having the smaller curvature. Pin 22 engages an opening 23 in the respective plunger 12. A liner piece 24 of small arcuate cross section corresponding to the other end of the oval portion 14 is pressed to clamp the plunger 12 by a cap screw 25 threaded in chuck housing 21.

It can thus be seen that there has been provided a multiple glass feed system for use with a glass forehearth including a plurality of closely spaced plungers, each of which is individually adjustable relative to the other. The upper end of each plunger is oval in cross section and the lower end is round. The upper end of each plunger has the same oval cross section. The lower end of each plunger has the same diameter. The oval portions of the plungers are provided in side by side relation with the long axis of each oval portion being parallel to the long axis of the adjacent plungers.

I claim:

1. A multiple orifice glass feed system for use with a glass forehearth including a plurality of closely spaced vertical plungers, each said vertical plunger having an upper portion and a lower portion, each said upper portion of each said vertical plunger having an upper end and a lower end, each said lower portion of each said vertical plunger being cylindrical in horizontal cross section, means for engaging the upper ends of said vertical plungers and supporting said vertical plungers in closely spaced side-by-side relationship with adjacent plungers being parallel, said means for engaging and supporting said plungers being constructed and arranged to vertically adjust each said plunger independently of the other vertical plungers said means for engaging and supporting said plungers comprises a clamping mechanism individual to each said plunger, and each said clamping mechanism comprising a chuck housing individual to each said plunger into which the upper end of said upper portion of said plunger extends, a curved liner plate interposed within said housing and means extending between said housing and said liner plate to cause said plate to engage said upper end of said upper portion of said plunger and clamp said plunger in said housing.

2. The multiple glass orifice feed system set forth in claim 1 wherein said chuck housing is oval in cross section and the upper end of said upper portion of each said plunger is oval in cross section.

* * * * *